Oct. 22, 1963 D. E. HULL 3,108,184
METHODS OF FLUID MEASUREMENT WITH RADIOACTIVE TRACERS
Filed June 8, 1959 3 Sheets-Sheet 1

INVENTOR
DONALD E. HULL
BY
ATTORNEYS

INVENTOR
DONALD E. HULL
BY Frank E. Johnston
Walter G. ...
ATTORNEYS

United States Patent Office 3,108,184
Patented Oct. 22, 1963

3,108,184
METHODS OF FLUID MEASUREMENT WITH RADIOACTIVE TRACERS
Donald E. Hull, San Rafael, Calif., assignor to California Research Corporation, San Francisco, Calif., a corporation of Delaware
Filed June 8, 1959, Ser. No. 818,973
10 Claims. (Cl. 250—43.5)

This invention relates to methods for the investigation of fluid flow in conduit systems by the use of radioactive tracers which are miscible or soluble in the fluid; and particularly refers to the steps of establishing a turbulent flow of fluid through the system, introducing a finite quantity of radioactivity into the fluid, and determining accurately the transit of said radioactivity through the predetermined part of the system which it is desired to investigate.

This application is a continuation-in-part of my co-pending application filed January 28, 1958, No. 711,714, entitled "Method of Measuring Volume by Fluid Displacement," now abandoned.

In the processing of certain materials, particularly hydrocarbons, where large tubular reactors are connected by piping which may be welded or securely fastened by other means, conditions arise which deposit quantities of solid materials such as coke or carbon in parts of the system. In operations where fluid flow rates and duration of reaction conditions must be carefully known and controlled, such accumulations frequently interfere with the process to an extent that renders it inoperable or at least uneconomical. Because of inaccessibility of the interior parts of such reactors, to determine whether or not they may have become obstructed, it is very difficult to determine the nature and particularly the extent of such deposits.

Also, in the accurate determination of flow rates of fluids in a complex piping system in which conventional flow measuring equipment is permanently installed, it is desirable frequently to check or calibrate the metering means. Heretofore it has been necessary to remove the metering units from the system for calibration in a laboratory or a shop, or in a specifically constructed and dimensioned loop of piping equipped with special pumps, tanks, timers and the like. This invention enables metering devices generally, for example positive displacement or turbine meters, venturi tubes, etc., to be calibrated in place, and under the normal conditions of operating fluids, temperatures and pressures. These last named conditions are usually impossible or uneconomical to reproduce and hence are either ignored, or corrected for in an approximate manner.

This invention, therefore, comprehends broadly procedures for the investigation of fluid flow in process or conduit systems by the use of extremely small (one millicurie or less) finite quantities of suitable radioactive tracer material to form a radioactive segment in the fluid normally flowing in the system and under normal operating conditions, the progress of the fluid being accurately determined by special arrangements of conventional electronic detecting, integrating, data storing, switching and indicating equipment. Examples of several applications of the novel procedures and results obtained therefrom will be discussed in detail in the following paragraphs.

This invention also comprehends specifically a procedure for determining the extent of deposition of solids in a predetermined part of a tubular fluid-conveying system without disconnecting or dismantling any parts of it and with only the introduction of a small quantity of a radioisotope which is miscible or soluble in the fluid of the system. Under some circumstances, it is possible to pass a fluid through such a system at an accurately known rate. In other cases this rate may not be known with sufficient accuracy, so that it is desirable to determine it by the method of a co-pending application, Serial No. 465,602, filed October 29, 1954, which issued March 11, 1958, as Patent No. 2,826,699, the disclosure of which is incorporated herein by reference. The utilization of the single radioisotope tracer introduction in that method may also be used by one procedure described herein to determine the volume of the predetermined part to be investigated by the method which will be outlined below. To facilitate an understanding of this embodiment of the invention, it will first be described in the simpler case where the rate of fluid flow is accurately known.

It is an object of this invention to provide a method for determining the net or unobstructed volume of a predetermined part of a fluid-conveying system, such as a tubular reactor, pressure vessel, condenser, or the like, without dismantling or opening any of the system or the piping connecting its several parts.

Another object is to provide a method of using a radioactive tracer technique to determine not only the net volume of a predetermined part of such a system, but also to measure accurately the flow rate at which the measuring fluid is passed into and through the unknown volume to be determined.

Another object is to provide a procedure for measuring the volume of an inaccessible part of a fluid-conveying system, using apparatus which is simple, is portable, and uses available radioisotopes which are in such low concentrations and small quantities that they are safe to handle without unusual or expensive precautions.

Another object is to provide a novel method of determining precisely the instantaneous location of the exact center of a radioactive segment in a continuously flowing fluid in a conduit system of known dimensions which may include conventional fluid flow metering equipment, so that the rate of fluid flow through the latter may be determined with a higher degree of accuracy than that obtainable heretofore.

Another object is to provide a complete disclosure of suitable electronic detecting, integrating, data storing and switching equipment suitable for practicing the methods involved, and to give automatic as well as manual operating procedures for obtaining the desired results.

These and other objects and advantages will be further apparent from the following description and the attached drawings, which form a part of this specification and illustrate preferred embodiments of illustrative equipment suitable for practicing the invention, as well as a graphical example of results obtained.

Figure 1:
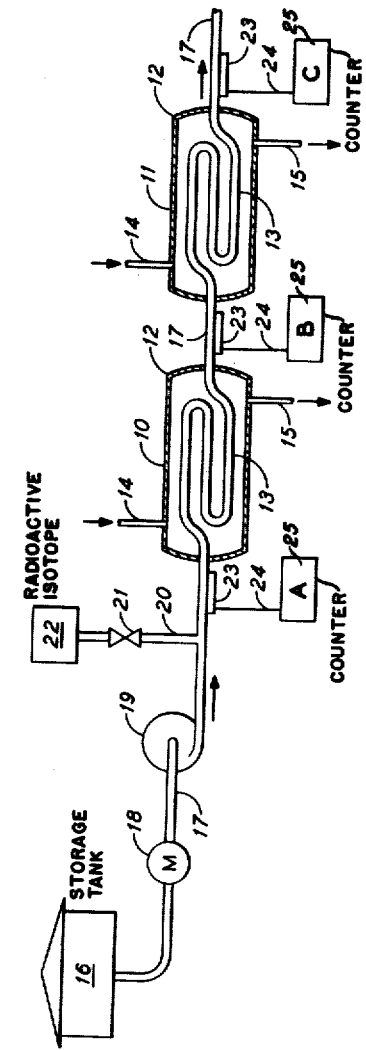
FIGURE 1 is a diagrammatic flow sheet of a pair of tubular reactors in series, showing the disposition of the tracer injection and radiation detection equipment for determining degree of plugging in the reactors.

The simple piping and tubular reactor system shown in the drawing as an example of the practice of the invention as applied to reactor plugging determination, includes two tubular reactors 10 and 11, each consisting of a cylindrical shell 12 containing a convoluted pipe or conduit 13 or other configuration such as a bank of parallel tubes, which may conveniently be designated a coil, through which reactant materials, usually liquids, are passed under accurately controlled conditions of temperature, flow rate and pressure. In this case the reaction is endothermic and at high pressure (3000 p.s.i.g.) so that a heating fluid, e.g., water at about 650° F., is circulated around coil 13 from shell inlets 14 to shell outlets 15 from any suitable source, not shown. Details of the structure of high pressure reactors 10 and 11 and coils 13 are not material to this disclosure and require no detailed description herein.

The liquid reactants or feed materials are stored in tank 16 and pass through connecting piping 17 and meter 18 to pump 19 and thence through the coils 13 of reactors 10 and 11 in series to a suitable receiver, not shown, for further treatment. Just ahead of reactor 10, a small tracer inlet connection 20 leads from piping 17 through valve 21 to a suitable chamber 22, in which a small quantity of a radioactive isotope tracer may be stored and pressurized, as by carbon dioxide or nitrogen gas, to be above the system pressure. The nature of the radioactive tracer necessarily depends upon the nature of the fluid in the system to be measured as it should be completely soluble or miscible therein. If gases are employed, krypton-85 is useful. Oil-conveying systems may use an oil-soluble salt of cobalt-60 or antimony-124. Water-soluble tracers for aqueous reactants, or if plain water is used for a test, include gold-198 or cesium-134. The amount of radioisotope used for a single injection will vary according to the size of the equipment involved, the thickness of piping 17, sensitivity of the detectors to radiation and other factors well known to those skilled in the art of radioactivity measurements.

Where it is possible to pass the fluid through the system at an accurately known constant rate, as indicated by meter 18, it is not necessary to know exactly the quantity of radioactive tracer which is introduced. If there should be no meter in the system, the procedure of copending application, Serial No. 465,602, now Patent No. 2,826,699, issued March 11, 1958, may be utilized, as will be pointed out below.

At the inlet of coils 13 of reactors 10 and 11 and also at the outlet of the latter, a detector for radioactivity 23, such as a G-M tube or scintillation detector unit, is secured to the outside of piping 17, or may be placed in an appropriate well or opening in the pipe. Each of these detectors is connected by a suitable lead 24 to its separate counter and scaler 25, hereinafter designated only as a counter, which will give both rate of counts and the total or integrated counts. These detectors and counters have been also designated A, B and C to correspond to the similarly designated curves on FIGURE 2. In this manner, counter A will respond to the added radioactivity in the segment of fluid passing into the coil 13 of reactor 10, counter B will perform a similar function as the radioactivity leaves 10 and enters reactor 11, and counter C will respond to radioactivity leaving the outlet of reactor 11.

Heretofore, the timing of the passage of a "wave" of radioactivity between spaced points at known distances apart has been proposed to determine rates of flow of liquids through unobstructed pipe lines. These have considered only the peak of maximum intensity of radiation response, expressed as counts detected per unit time, for example, counts per second. It has been discovered by this invention, however, that the peak of maximum radiation intensity does not represent accurately the instantaneous position of the segment of fluid to which the radioactivity has been added. Accordingly, it is a principal objective of this disclosure to point out how this instantaneous position may be timed accurately so that the unknown volume of a predetermined portion of a partially plugged system may be determined. In addition, by utilizing the invention of co-pending applications, Serial Nos. 465,602 and 581,099, now Patent Nos. 2,826,699 and 2,826,700, the single injection of radioisotope tracer and only one of the several detectors may also be used to determine accurately the flow rate through the system, for purposes which will be further apparent below.

Figure 2:
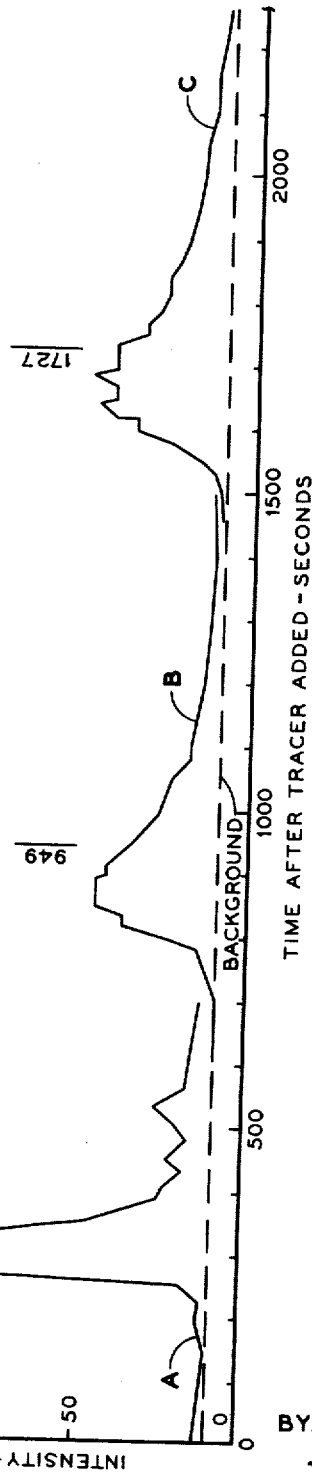
FIGURE 2 is a chart showing the relation of elapsed time to counts of radioactivity detected at selected points in the system of FIGURE 1.

Under the circumstances outlined, where the flow rate of the fluid through the system represented is accurately known, the operation is carried out by releasing a small and not necessarily known quantity of radioactive isotope from container 22 into pipe 17 by means of valve 21. The response of the first detector 23A to the passage of the tracer as counted by counter 25A may be plotted with respect to time as illustrated in the chart of FIGURE 2 for purpose of explanation. That part of the area of curve A above the dotted line representing the "background" due to cosmic rays and the like, represents the total net counts detected at the inlet of coil 13 in reactor 10. Either by trial and error from the total number of net counts recorded by 25A or by the use of appropriate instrumentation, which will be understood by those skilled in this art, a line 301 is drawn at that time which will divide the total net counts into two halves. The time at which this is located, in this example 301 seconds after introduction of the isotope into pipe 14, represents the instant that the exact center of the segment of the fluid containing the isotope material passed into the inlet of coil 13 of reactor 10. It may not necessarily coincide with the maximum rate of detection by tube 23A, or, as will be pointed out below, the curve may not have any sharply defined peak of intensity.

Subsequently, at a later time, dependent upon the known flow rate of the fluid, the volume of coil 13 in reactor 10 and the amount of solid deposit which occupies an unknown part of that coil, the segment of fluid containing the isotope will pass the second detector 23B. The response of this detector is counted by counter 25B and a similar curve B (FIGURE 2) is plotted for the response of that instrument. The line 949 of FIGURE 2 is determined as outlined above to represent the instant of time at which one-half of the total counts have been accumulated on detector 23B, which is substantially at the outlet of coil 13 in reactor 10. In the example shown, this is located at 949 seconds after the original introduction of the isotope. It will be noted that this is not at all coincident with the maximum intensity of detector response, which lasted for a period of 50 seconds at a substantially constant value.

From the known flow rate V of the fluid through the system and the difference between time 949 and time 301, which may be represented by T, the unobstructed volume Q of coil 13 of reactor 10 may be accurately determined by the Equation $Q = VT$. From the known internal dimensions of the coil 13 of reactor 10, the amount of deposited material may then be determined by subtraction, if this is desired.

As the detector 23B and counter 25B are at the inlet of coil 13 of reactor 11, the exact time required for the passage of the isotope-containing segment of fluid through the last-named reactor coil may be obtained from a comparison of the response of outlet detector 23C and counter 25C. This is done by repeating the procedure just given for A and B and results in curve C of FIGURE 2. The exact time 1727, representing the passage of one-half the isotope-containing segment and hence one-half of the total net counts from the outlet of that reactor coil, also does not coincide with the maximum response of detector 23C, as will be apparent from that curve. In that case there were not only two small "peaks" separated by 50 seconds, but a plateau of substantially uniform intensity that lasted over 100 seconds. Obviously, it would be impossible to determine from the "maximum response" procedure of the prior art the instantaneous time value needed for a solution of this problem.

As a specific example of the practice of this procedure, it was required to determine the percentage of volume occupied by solid deposits in two similar reactor coils in a chemical reactor system operating at about 3000 p.s.i.g. and 630° F., with a known liquid flow rate of 60 g.p.m. The quantity of aqueous radioisotope tracer added was 55 millicuries of gold-198 in 500 milliliters of aqueous solution. The total net counts for curve A, as determined by counter 25A were 10,850, and by plotting and inspection of the results as outlined above, it was determined that one-half of the counts had accumulated on detector 23A at a time 301 seconds after the introduction of the isotope from container 22. This was the time at which one-half of the tracer had passed detector 23A. The interval of 301 seconds represented the time taken by the segment of liquid in which the tracer was introduced to traverse the volume of piping 17 between the injection connection 20 and detector 23A. In this example, the detector 23 was a Nuclear Development Company No. GC-1-K, and the counter was a Berkeley Scaler Model 1000-B.

For curve B, the total net counts were 9700, due to different geometry of the pipe and the detector, and by similar plotting and inspection of the results in was found that one-half the isotope had passed detector 23B at a time 949 second after its introduction, so that by difference, the exact time for traverse of reactor coil 13 of reactor 10 was 648 seconds. The known initial or clean volume of the coil was 5 cubic feet, and the internal diameter of coil 13 was such that the liquid should have traversed it in 945 seconds. The percentage of space occupied by solid deposits was, therefore:

$$\frac{100(945-648)}{945}=31.4\%$$

The same procedure for the similar coil 13 in reactor 11 gave a total net count of 9800, and by inspection of curve C it was found that one-half of the added radioactivity had passed detector 23C at a time 1727 seconds after its introduction. By difference, the exact time for traverse of that coil was 778 seconds. Thus by following the same procedure as just given, it was determined that the space occupied by solid deposits was:

$$\frac{100(945-778)}{945}=17.7\%$$

It will be appreciated that these determinations were made without any interference to the normal operation of the reactor system, as the few milliliters of the aqueous radioisotope solution from container 22 had no measurable effect on the flow rate or the reactions taking place. The detectors 23 were temporarily secured outside of and against the piping 17 at the points indicated in FIGURE 1, for the duration of the test.

Under some circumstances, the volumetric rates of flow V of the fluid may not be known to a desired degree of accuracy. Under these condiitons, the method of determining fluid flow described and claimed in copending application Serial No. 465,602, now Patent No. 2,866,699, may be utilized. That procedure is based upon the principle of integrating the response of a single detector of radioactivity, for example, a Geiger counter, while a definite known quantity of a radioactive isotope tracer having known properties flows in a segment of the fluid through the pipe or passage with which the single detector is associated. The number of counts so recorded, after subtracting the background, is independent of the way in which the concentration of tracer varies along the pipe, but is inversely proportional to the velocity at which the tracer flows past the detection point.

The number of counts, for example, registered by the detecting and indicating equipment does depend upon the pipe dimensions and the geometry and placement of the detector units with respect to the fluid stream and the passage through which it moves. A proportionality factor or response characteristic for a given size, material, and type of pipe may be determined by filling a short section of the same or equivalent pipe with a fluid concentration of the specific radioactive isotope and noting the counting rate of the detector, also placed in a comparable position to that of the field use. The factor F, which represents counts per unit time registered from a unit of radioactivity per unit volume, as, for example, counts per minute from a concentration of one microcurie per gallon, may be used in the above-mentioned equation to calculate absolute values of flow rates, as is shown by the following discussion.

Let N be the integral number of counts and R be the instantaneous counting rate, both corrected for background. Then over the duration of the passage of the tracer:

$$N = \int R\, dt \quad (1)$$

Now R is proportional to the continually varying concentration C of the tracer. The proportionality constant is the factor F, determined by calibration for a given pipe and detector geometry.

$$R = FC \quad (2)$$

Substituting, $$N = F \int C\, dt \quad (3)$$

Let V be the flow rate in gallons per minute. Then $dq$, the increment of volume passing during the interval $dt$, is $$dq = V\, dt \quad (4)$$

Again substituting:

$$N = \frac{F}{V}\int C\, dq \quad (5)$$

But the integral of radioisotope concentration over the total volume is simply the total quantity A of radiotracer, expressed in appropriate units, e.g., millicuries $$\int C\, dq = A \quad (6)$$

Hence, $$N = \frac{FA}{V} \quad (7)$$

Solving for flow rate, $$V = \frac{FA}{N} \quad (8)$$

Assuming that F has been determined for a known isotope concentration in a given fluid and in a given pipe, for example a section of piping 17, the experimental measurement of the quantity of isotope injection A and of the number of total net counts recorded N gives the necessary data for calculating V.

Under the circumstances just outlined, it will be apparent to one skilled in this art that it will be necessary to predetermine the amount of radioactivity A which is mixed into the fluid in pipe 17. All of the other factors needed for the flow rate component of this method are available from the procedure and apparatus illustrated in FIGURES 1 and 2.

Briefly, the steps will involve establishing a uniform, although not necessarily known, rate of fluid flow through the system, mixing a predetermined quantity A of radioactivity into the fluid ahead of the inlet to the coil 13 of reactor 10, separately detecting the counts due to the passage of the added radioactivity at the inlet and at the outlet of reactor 10, determining the radioactive response characteristic F of the pipe 17 and detector 23 for a known concentration of radioactivity in the fluid, integrating the total counts N detected at said detecting points, determining the elapsed time T between the transit of one-half of the segment of fluid containing the radioactivity and hence one-half of said total counts at said inlet point and said outlet point, as by the procedures of FIGURE 2 discussed above, and determining the net volume Q of coil 13 of reactor 10 which is not occupied by solids according to the equation $$Q = \frac{FAT}{N}$$

As the total counts at both the inlet and outlet detecting points should be the same, if the geometry and detector characteristics are the same, either value may be used for the quantity N, and one value will serve as an experimental check on the other.

Figure 3:
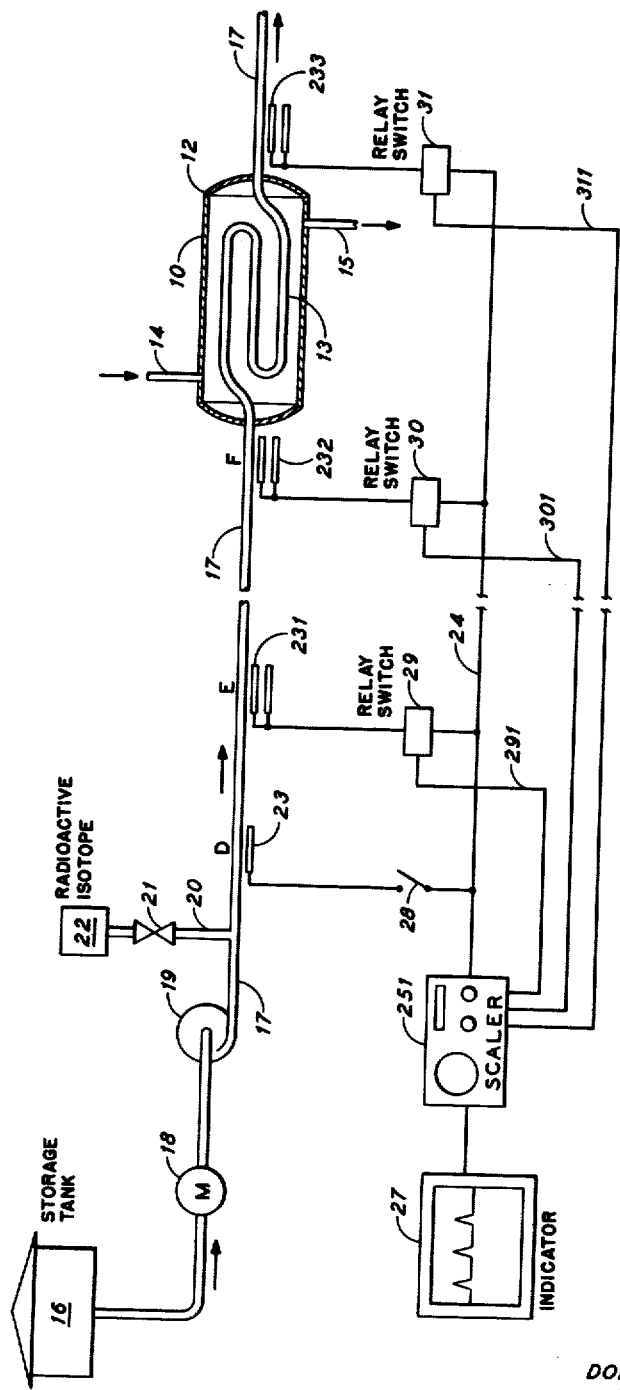
FIGURE 3 is a diagrammatic illustration of an alternative arrangement for calibrating the meter 18 in the piping system of FIGURE 1 to a high degree of accuracy, by means of multiple radioactive detectors and integrating, data storing, switching and indicating equipment. Where applicable, the same reference numerals are used as in FIGURE 1.

Referring now to FIGURE 3, it will be noted that this represents the one-half total net count procedure already discussed, as specifically applied to the location of the instantaneous position of the center of the radioactive segment in a predetermined portion of conduit 17 so that its progress may be accurately followed. Also, it constitutes an accurate method for calibrating the meter 18 when that is desired. A somewhat more elaborate electronic detector, integrator and indicator array is involved in this example, as will be apparent from the following description.

As in the first example given, liquid stored in tank 16 passes at a uniform rate through meter 18 and pump 19 in line 17, which leads to the inlet of coil 13 in reactor 10. In this case, however, the primary objective is to calibrate the meter 18, by observing accurately and under the normal fluid pressure, temperature and flow conditions of the system, the progress of the radioactive fluid segment formed by the tracer from chamber 22 through a uniform diameter section of pipe 17 between points D and F, and particularly between points E and F. The distance between these last-named points and the unobstructed cross-sectional area of conduit 17 should be known to the degree of accuracy expected to be obtained for the flow rate determination.

At point D of line 17, a detector for radioactivity 23, such as a single G-M tube or scintillation detector unit responsive to the specific type of radiation from the tracer inside the conduit is secured to the outside of piping 17, or may be placed in a well or opening in the pipe. At appropriate known distances downstream from point D and ahead of reactor 10, additional detectors 231 and 232 are placed in comparable relation to pipe 17. Desirably, but not necessarily, the last-named detectors are chosen, either as to number of separate G-M tubes or by other means, to give twice the signal response to the transit of given quantity of radioactive material inside of pipe 17 as that of the first detector 23. Depending upon the sensitivity of the detectors, the rate of fluid flow in pipe 17, and the types of automatic counting, integrating, storing and switching equipment chosen, the linear distances between D, E, and F desirably should be such that a time of the order of one minute or more should be required for the radioactive segment to pass from point E to the succeeding point F in line 17. A precision of the order of one second in timing the half-total-count will then give an accuracy in the calibration of the order of one percent. Alternatively, for a scale-of-128 counter, it is desirable to use sufficient radioisotope to have each detector impose at least 10 digits upon the register or the data storage component of 251 during the transit of the radioactive segment.

For purposes of determining plugging or internal fouling of the coil 13 in reactor 10, a detector 233 similar to 231 and 232 may be placed at the outlet of that coil, in the manner previously described for the arrangement of FIGURE 1.

In this example, a suitable electronic scaler or counter 251 such as Model 151A made by Nuclear Chicago Company, Chicago, Illinois, with integrating means for selectively determining and storing the total counts or a fraction of the total counts accumulated by any one of the detector units 23, 231, 232 and 233, is provided as shown. This scaler is connected by a common dual lead 24 through switches 28, 29, 30 and 31 to the respective detector units. Desirably, switches 29, 30 and 31 include relays that are actuated from counter 231 through leads 291, 301 and 311, by a conventional data storage component of the scaler 251. Alternatively, these could be simple switches similar to 28, which are adapted to be manually operated by an observer of the integrated count data shown by the visual indicator of scaler 251.

A graphic indicator or timing unit 27 is illustrated as being connected to scaler 251, to indicate either the instantaneous readings of the count rate in the form of a continuous chart (FIGURE 2) or to give actual times elapsed between predetermined fractions of total counts picked up by detectors 23, 231, 232 and 233 and accumulated or integrated and stored by scaler 251.

In operation, to determine the flow rate through conduit 17 and specifically the exact elapsed time required for the radioactive segment containing the tracer from container 22 to pass from point E to point F, the control valve 21 is actuated to release quickly a small quantity of the radioisotope tracer from container 22 into the conduit 17 through branch 20. Switch 28 is then closed, connecting detector 23 to scaler 251, and the latter accumulates or integrates the total number of counts during the entire transit of the radioactive segment past that detector. The scaler is then cleared in the usual manner. If the response characteristic of 23 is inherently or deliberately chosen to be one-half that of detectors 231 and 232, the entire number of total counts from detector 23, e.g., "$T_0$," after subtracting the background due to cosmic rays etc., is stored in the data storage component of scaler 251, and the relay 29 is then actuated to connect the detector 231 at point E to scaler 251.

If unit 27 is a simple timer, as distinguished from a graphic recorder, the data storage component of scaler 251 starts it running when the integrated value $T_1$ from detector 231, due to the transit of the radioactive segment, equals the value $T_0$. The remaining half of the total counts from 231 may be ignored. At the same time, scaler 251 clears itself, opens relay 29 and closes relay 30, thus placing the detector 232 in communication with scaler 251. While the radioactive segment passes point F in conduit 17, the last-named detector will respond, and scaler 251 will start to accumulate or integrate the counts. When that value $T_2$, equals $T_0$, the data storage component of 251 will stop timer 27, which will then indicate the elapsed time required by the exact center of the radioactive segment to pass from point E to point F. From the known cross-sectional area of conduit 17 and the known linear distance between E and F, the fluid flow rate is readily computed for the actual conditions of process fluid, pressure and temperature condition of the system. This value may then be compared with the indication of fluid flow meter 18, thus determining the accuracy of its calibration.

If all three detectors 23, 231 and 232 have substantially identical response characteristics, and manual instead of automatic operation is desired, the operator can manually connect scaler 251 to detector 23 by means of switch 28, after the introduction of the radioisotope tracer into line 17, and then observe the net total integrated counts indicated by scaler 251 from that detector at point D. Assuming this to be some finite value, e.g., 100, he then opens switch 28, clears the scaler and closes switch 29 and waits for scaler 251 to start responding to the transit of the radioactive segment past detector 231 at point E. When the indicated count from that detector reaches the value 50, or one-half the total which had been accumulated by detector 23, he starts a stopwatch or other timer, opens switch 29, clears the scaler and closes switch 30, thus connecting detector 232 at point F to scaler 251. When the scaler accumulates 50 counts from that detector, the operator stops the watch or timer, and notes the elapsed time, which is exactly that required for the center of the radioactive segment to travel the known distance from point E to point F of conduit 17.

Figure 4:
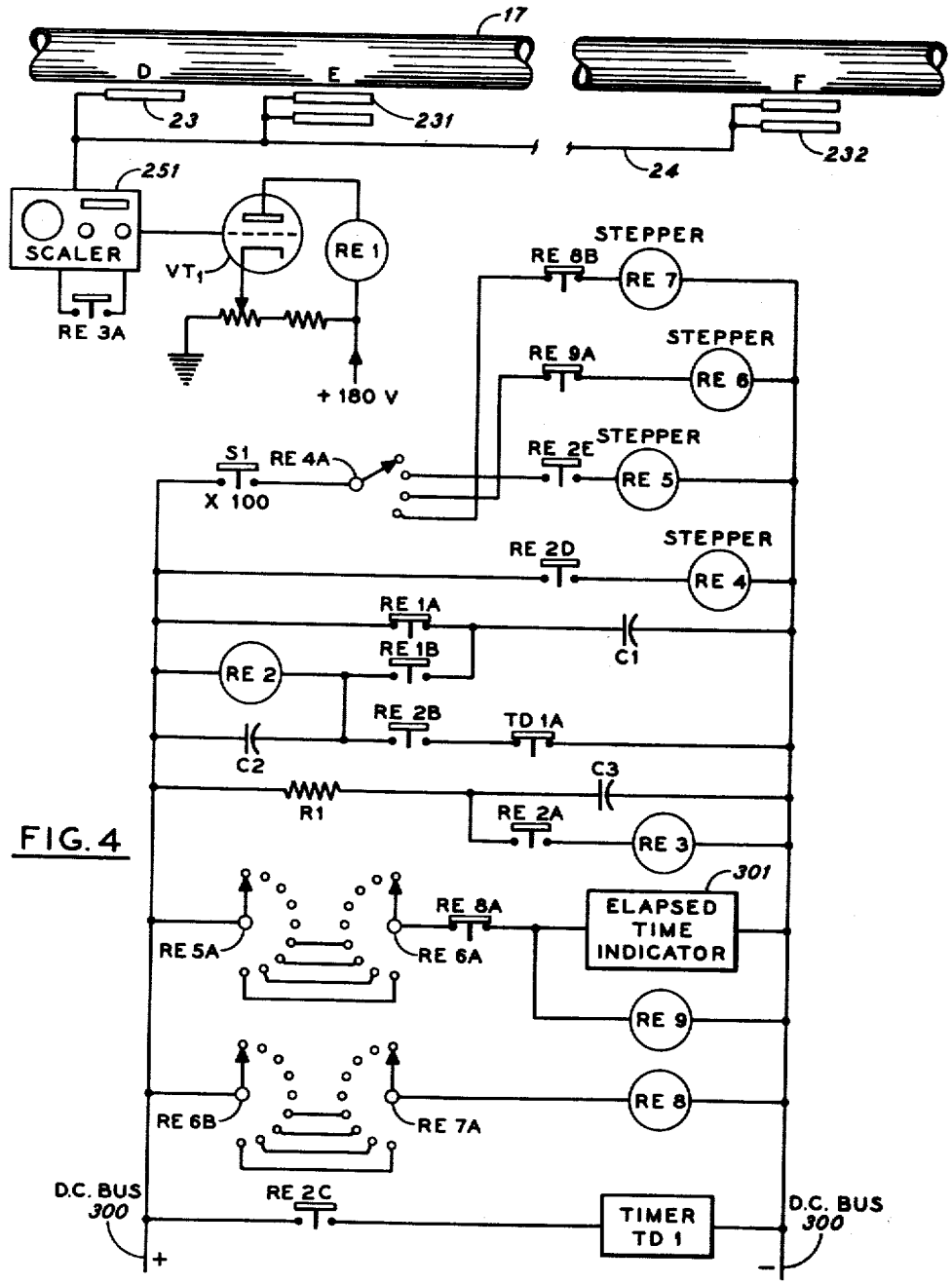
FIGURE 4 is a diagrammatic illustration of a specific arrangement of an automatic electronically controlled system alternative to that of FIGURE 3, just described.

Referring now to FIGURE 4, which illustrates in detail a fully automatic electronically controlled arrangement alternative to that of FIGURE 3, the G-M tubes at D, E and F are all connected in parallel to scaler 251, the output of which is led to a vacuum tube $VT_1$. The pulses from the detectors are amplified and appear in the plate circuit of $VT_1$, actuating relay $RE_1$, which controls contacts $RE_1A$ and $RE_1B$. The action of these contacts is alternately to charge condenser $C_1$ from D.C. bus 300 and to discharge that condenser through the coil of relay $RE_2$ and condenser $C_2$. The parameters of the coil resistance, the capacitance of condenser $C_2$ and the pull-in characteristics of relay $RE_2$ are chosen so that the last-named relay will not be actuated by the relatively slow background count, but will be actuated by the increased frequency of count rate when the leading end of the radioactive tracer segment starts to pass the single G-M tube 23 at point D. When that occurs, the following takes place.

(1) Normally open relay $RE_2A$ contact closes, discharging condenser $C_3$ through relay $RE_3$ and closing contact $RE_3A$ only momentarily. This is due to the current-limiting action of resistor $R_1$ which reduces the current below the hold-in value for the coil of relay $RE_3$. The closing of that relay actuates contact $RE_3A$ to clear or reset to zero the scaler 251 of any accumulated counts due to background. Contact $RE_2B$ also closes, locking relay $RE_2$ closed.

(2) Contact $RE_2C$ is also closed, initiating a timing cycle in timer $TD_1$ which is chosen to be long enough to insure the counting of all the radiation from the tracer segment as it passes point D and G-M tube 23.

(3) Contact $RE_2D$ is similarly closed, actuating stepping relay $RE_4$ to contact X100, which changes the output of scaler 251 from a lower scale such as 1:1 to a higher scale such as 100:1. Thereafter, scaler contact $S_1$ closes for each 100 counts of input from G-M tube 23, moving stepping relay contact $RE_5A$ to a point corresponding to the number of contacts made by $S_1$. When a sufficient time has elapsed for all of the tracer to pass point D, timer $TD_1$ opens, unlocking relay $RE_2$ and terminating the counts through contacts $RE_2E$ to stepping relay $RE_5$.

The approach of the radioactive segment in the fluid in pipe 17 to point E and detector 231 causes the last sequence given in the preceding numbered paragraph to repeat itself, so that the stepping relay $RE_4$ will advance contactor $RE_4A$ one more step and the scaler 251 will now feed the pulses from the two parallel G-M tubes 231 at point E through stepping relay $RE_6$. Thus the count of radioactivity response will be twice as great as that for point D, giving a result equivalent to that following the disclosures given above for the earlier-described embodiments of this invention. When the corresponding contact previously reached by stepping relay $RE_5A$ is again reached, a circuit is completed through the elapsed time indicator 301 and relay $RE_9$ through contacts $RE_5A$, $RE_6A$ and $RE_8A$, whereupon $RE_9R$ opens, holding $RE_6A$ in its last attained position. The elapsed time indicator 301 now starts to operate, as it is started when just one-half of the total counts has been accumulated from the entire traverse of the radioactive segment past point E.

The sequence at point F repeats that just given as for point E, except that stepping relay $RE_4$ has now advanced its contact $RE_4A$ to energize stepping relay $RE_7$. This last-named relay is stepped by succeeding pulses from scaler 251 until a circuit is available through the contact $RE_6B$, which has meanwhile stepped with $RE_6A$ through a corresponding contact on $RE_7A$. This energizes relay $RE_8$ from bus 300, opening contact $RE_8A$ and stopping the elapsed time indicator 301. Contact $RE_8B$ opens, holding $RE_7A$ in its last-attained position.

Thus, the exact time required for the passage of the fluid in pipe 17 between points E and F has been determined and indicated on 301, enabling meter 18 to be calibrated by the procedure described above to the degree of accuracy desired.

The reset means available for the various stepping relays and timers to start a new measuring sequence are not described herein, as they form no part of the subject invention.

Following are examples of comparisons of the results of this method with positive displacement procedures using a calibrated pipeline loop and also with accurate tank gauges.

TABLE I

*Flow Rates From Radioactive Pulse and From Pipe Loop Displacement*

[Flow rates (barrels per second)]

| Test No. | Radioactive | Displacement | Ratio R/D |
|---|---|---|---|
| 1 | 0.1338 | 0.1335 | 1.002 |
| 2 | 0.1338 | 0.1335 | 1.002 |
| 3 | 0.703 | 0.0704 | 0.999 |
| 4 | 0.700 | 0.0702 | 0.997 |
| Average | | | 1.000 |

TABLE II

*Flow Rates by Radioactive Pulse and From Tank Gauges*

| Tank No. | 10″ Pipeline Length (ft.) | Vol. (bbl.) | Time Interval, Seconds | Flow Rate in bbl./min. Radioactive | Tank Gauge |
|---|---|---|---|---|---|
| 1459 | 125 | 7.72 | 15.6 | 29.8 | 31.0 |
| 1514 | 250 | 15.43 | 31.0 | 30.0 | 31.0 |
| 1514 | 250 | 29.94 | 48.0 | 31.2 | 33.3 |
| | 200 | 19.94 | 36.1 | 33.2 | 32.2 |

In conclusion, it will be appreciated that this invention relates broadly to the determination of an unknown volume in a predetermined part of a fluid-conveying system utilizing the passage of a radioisotope therethrough and also to the accurate determination of the time that the center of the segment containing the added radioactivity, as represented by the total counts resulting from the addition of the isotope, has taken to pass detectors for radioactivity at the inlet of the predetermined part and at the outlet thereof. Where the flow rate is known, as by another type of flow-metering device, such as an orifice meter, the quantity of radioisotope need not be measured. Where a meter calibration is desired, and the cross-sectional area and length of the conduit system permits, this may be readily carried out either manually or automatically, as is described above.

Where the flow rate is not known to a sufficient or desired degree of accuracy, the procedure of simultaneous flow rate determination and volume determination may be carried out, utilizing the steps discussed above and recited in the appended claims.

It will also be apparent to one skilled in this art that numerous modifications and changes may be made without departing from the essential features of the invention and such are intended to be included in the scope of the claims.

I claim:

1. The method of determining an unknown volume Q in a predetermined part of a fluid-conveying system, comprising the steps of establishing a uniform flow of fluid through said system at a known rate V, mixing a quantity of radioactivity into said fluid ahead of the inlet to said part, separately detecting the counts due to the passage of said added radioactivity at the inlet of said part and at the outlet of said part, integrating the total net counts detected at each of said detecting points, obtaining the elapsed time T between the transit of one-half the radioactivity as represented by one-half of said total counts at said inlet point and one-half of said total counts at said outlet point, and obtaining the value of said unknown volume from the relationship $Q=VT$.

2. The method of determining an unknown volume Q in a predetermined part of a fluid-conveying system, comprising the steps of establishing a uniform flow of fluid through said system, mixing a predetermined quantity A of radioactivity into said fluid ahead of the inlet to said part, separately detecting the counts due to the passage of said added radioactivity at the inlet of said part and at the outlet of said part, obtaining the radioactive response characteristic F of said system for at least one of said detecting points, integrating the total net counts N detected at each of said detecting points, obtaining the elapsed time T between the transit of one-half of the radioactivtiy as represented by one-half of said total counts at said inlet detecting point and one-half of said total counts at said outlet detecting point, and obtaining the value of said unknown volume from the relationship $$Q = \frac{FAT}{N}$$

3. The method of determining an unknown volume Q in a predetermined part of a fluid-conveying system, comprising the steps of establishing a uniform flow of fluid through said system, obtaining the rate V of said fluid flow, mixing a quantity A of radioactivity into said fluid ahead of the inlet to said part, separately detecting the counts due to the passage of said added radioactivity at the linet of said part and at the outlet of said part, integrating the total counts detected at each of said detecting points, obtaining the elapsed time T between the accumulation of one-half of said total counts at said inlet point and one-half of said total counts and at said outlet point, and obtaining the value of said unknown volume from the relationship $Q=VT$.

4. The method of determining the volume of a predetermined part of a fluid-conveying system, comprising the steps of introducing a radioactive isotope into a segment of said fluid, positioning a detector for radioactivity at each end of said part, integrating the response of each of said detectors to obtain a net total count representing the transit of said segment, obtaining the time interval between the transit of one-half of said net total count past each detector, measuring the rate of flow of said fluid, and obtaining the value of said volume from the relationship $Q=VT$, where $Q$=volume of predetermined part,
$V$=rate of fluid flow, and
$T$=time interval.

5. The method of determining the instantaneous position of the center of a radioactive segment of a fluid stream flowing in a confined passage, comprising the steps of positioning a detector for radioactivity adjacent said passage, mixing a finite quantity of radioactive tracer in said fluid stream to form said segment, integrating the response of said detector to obtain the net total counts representing the transit of said entire segment, and obtaining the time that one-half of said net total counts have been accumulated by said detector.

6. The method of determining the instantaneous position of the center of a radioactive segment of a fluid stream flowing in a confined passage, comprising the steps of positioning a detector for radioactivity adjacent said passage, mixing a finite quantity of radioactive tracer in said fluid stream to form said segment, integrating the response of said detector to obtain the net total counts representing the transit of said entire segment, and electronically determining the time that one-half of said net total counts have been accumulated by said detector.

7. The method of controlling the operation of a timing device for indicating the instantaneous position of the center of a radioactive segment of a fluid stream flowing in a confined passage, comprising the steps of positioning a first detector for radioactivity adjacent to said passage, mixing a finite quantity of radioactive tracer in said fluid stream to form said segment, integrating the response of said first detector to obtain the total counts due to the transit of said segment, dividing said response by two to obtain one-half of said total counts, storing said last-named value, positioning a second detector for radioactivity at a point downstream from said first detector, said second detector having a similar response characteristic to said first detector, integrating the response of said second detector, and actuating said timing device when the integrated response of said second detector equals the stored one-half integrated value determined from the response of said first detector.

8. The method of controlling the operation of a timing device for indicating the instantaneous position of the center of a radioactive segment of a fluid stream flowing in a confined passage, comprising the steps of positioning a first detector for radioactivity adjacent to said passage, mixing a finite quantity of radioactive tracer in said fluid stream to form said segment, integrating the response of said first detector to obtain the total counts due to the transit of said segment, electronically dividing said response by two to obtain one-half of said total counts, electronically storing said last-named value, positioning a second detector for radioactivity at a point downstream from said first detector, said second detector having a similar response characteristic to said first detector, integrating the response of said second detector, and electronically actuating said timing device when the integrated response of said second detector equals the stored one-half integrated value determined from the response of said first detector.

9. The method of controlling the operation of a timing device for indicating the instantaneous position of the center of a radioactive segment of a fluid stream flowing in a confined passage, comprising the steps of positioning a first detector for radioactivity adjacent to said passage, mixing a finite quantity of radioactive tracer in said fluid stream to form said segment, integrating the response of said first detector to obtain a value representing the total counts due to the transit of said segment, storing said value, positioning a second detector for radioactivity at a point downstream from said first detector, said second detector having a response characteristic twice that of said first detector, integrating the response of said second detector to the transit of said segment, and actuating said timing device when the integrated response of said second detector equals said stored value.

10. The method of controlling the operation of a timing device for indicating the velocity of flow of a fluid in a confined passage, comprising the steps of positioning a first detector for radioactivity at a first point adjacent to said passage, mixing a finite quantity of a radioisotope tracer in said fluid stream to form a radioactive segment, integrating the response of said detector to obtain a value representing the total counts due to the transit of said segment, storing said value, positioning a second detector for radioactivity at a second point downstream from said first point, said second detector having a response characteristic twice that of said first detector, integrating the response of said second detector to the transit of said segment, starting said timing device when said integrated response of said second detector equals said stored value, positioning a third detector for radioactivity at a predetermined distance downstream from said second detector, said third detector having a response characteristic equal to said second detector, integrating the response of said third detector to the transit of said segment, and stopping said timing device when said integrated response of said third detector equals said stored value.

References Cited in the file of this patent

UNITED STATES PATENTS

| | | |
|---|---|---|
| 2,453,456 | Piety | Nov. 9, 1948 |
| 2,826,699 | Hull | Mar. 11, 1958 |
| 2,826,700 | Hull | Mar. 11, 1958 |
| 2,841,713 | Howard | July 1, 1958 |

UNITED STATES PATENT OFFICE
CERTIFICATE OF CORRECTION

Patent No. 3,108,184            October 22, 1963

Donald E. Hull

It is hereby certified that error appears in the above numbered patent requiring correction and that the said Letters Patent should read as corrected below.

Column 3, lines 23 and 24, for "heating1" read -- heating --; column 6, line 68, for "injection" read -- injected --; column 9, line 74, for "$RE_9R$" read -- $RE_9A$ --; column 11, line 48, for "linet" read -- inlet --.

Signed and sealed this 28th day of April 1964.

(SEAL)
Attest:

ERNEST W. SWIDER            EDWARD J. BRENNER

Attesting Officer            Commissioner of Patents